United States Patent
Uhm et al.

(10) Patent No.: US 11,933,812 B2
(45) Date of Patent: Mar. 19, 2024

(54) CROSS-BEAM AXIAL ACCELEROMETER

(71) Applicant: AGENCY FOR DEFENSE DEVELOPMENT, Daejeon (KR)

(72) Inventors: Wonyoung Uhm, Daejeon (KR); Junyong Jang, Daejeon (KR); Kangsun Suh, Seoul (KR); Hanseong Jo, Seoul (KR); Young-Ho Cho, Seoul (KR); Minho Seok, Seoul (KR)

(73) Assignee: AGENCY FOR DEFENSE DEVELOPMENT, Daejeon (KR)

( * ) Notice: Subject to any disclaimer, the term of this patent is extended or adjusted under 35 U.S.C. 154(b) by 0 days.

(21) Appl. No.: 18/046,358

(22) Filed: Oct. 13, 2022

(65) Prior Publication Data
US 2023/0124407 A1    Apr. 20, 2023

(30) Foreign Application Priority Data
Oct. 14, 2021    (KR) .......................... 10-2021-0136658

(51) Int. Cl.
| | | |
|---|---|---|
| G01P 15/18 | (2013.01) | |
| G01P 15/08 | (2006.01) | |
| G01P 15/09 | (2006.01) | |
| G01P 15/097 | (2006.01) | |
| G01P 15/125 | (2006.01) | |

(52) U.S. Cl.
CPC .............. G01P 15/18 (2013.01); G01P 15/08 (2013.01); G01P 15/09 (2013.01); G01P 15/0922 (2013.01); G01P 15/097 (2013.01); G01P 15/125 (2013.01)

(58) Field of Classification Search
CPC ...... G01P 15/0922; G01P 15/08; G01P 15/18; G01P 15/125; G01P 15/0802; G01P 15/09; G01P 15/097
See application file for complete search history.

(56) References Cited

U.S. PATENT DOCUMENTS

| | | | | |
|---|---|---|---|---|
| 4,928,203 A | * | 5/1990 | Swindal ................ | G01P 15/125 |
| | | | | 73/514.24 |
| 5,121,180 A | * | 6/1992 | Beringhause ....... | G01P 15/0802 |
| | | | | 73/768 |
| 5,343,731 A | * | 9/1994 | Miyano .................. | G01P 15/12 |
| | | | | 73/514.36 |

(Continued)

FOREIGN PATENT DOCUMENTS

| | | |
|---|---|---|
| CN | 107643424 A | 1/2018 |
| EP | 3220153 B1 | 10/2018 |

(Continued)

*Primary Examiner* — Helen C Kwok
(74) *Attorney, Agent, or Firm* — Kolitch Romano Dascenzo Gates LLC

(57) ABSTRACT

Provided is an accelerometer. The accelerometer includes a frame portion with an opening formed inside, a central portion disposed in the opening, a connecting portion disposed on an upper surface and a lower surface of the central portion and connecting the frame portion and the central portion, and a sensing portion that converts a sensed acceleration into an electrical signal, and the accelerometer senses an acceleration in a Z-axis direction penetrating an upper surface and a lower surface of the central portion, and reduces a sensing of an acceleration in an X-axis direction and a Y-axis direction crossing the Z-axis direction.

19 Claims, 16 Drawing Sheets

(56) References Cited

U.S. PATENT DOCUMENTS

| | | | | |
|---|---|---|---|---|
| 5,460,044 A * | 10/1995 | Yamamoto | ............. | G01P 21/00 73/514.16 |
| 5,652,384 A * | 7/1997 | Henrion | ............... | G01P 15/125 73/514.24 |
| 5,780,742 A * | 7/1998 | Burns | ................... | G01P 15/097 73/514.29 |
| 5,974,880 A * | 11/1999 | Yamaguchi | .......... | G01P 15/125 73/514.32 |
| 6,035,714 A * | 3/2000 | Yazdi | ................. | G01P 15/0802 73/514.32 |
| 8,522,613 B2 * | 9/2013 | Suzuki | ................. | G01P 15/123 73/514.33 |
| 9,823,267 B2 | 11/2017 | He | | |
| 2006/0144144 A1 * | 7/2006 | Seto | ........................ | G01P 15/18 73/514.33 |
| 2007/0022814 A1 * | 2/2007 | Seto | ........................ | G01P 1/023 73/514.34 |
| 2010/0218607 A1 * | 9/2010 | Kazama | ................. | G01P 15/18 73/514.33 |
| 2011/0239784 A1 * | 10/2011 | Ohsato | ................. | G01P 15/123 73/514.33 |
| 2012/0268526 A1 * | 10/2012 | Huffman | ............. | B41J 2/14427 347/54 |
| 2013/0091949 A1 * | 4/2013 | Huang | ................. | G01P 15/123 73/514.34 |
| 2013/0283914 A1 * | 10/2013 | Imanaka | ................ | G01P 15/02 73/514.36 |
| 2014/0069191 A1 * | 3/2014 | Yu | .......................... | G01P 15/02 73/514.36 |
| 2017/0269119 A1 * | 9/2017 | Zhang | ................. | G01P 15/0922 |

FOREIGN PATENT DOCUMENTS

| | | |
|---|---|---|
| JP | 09196967 A | 7/1997 |
| JP | 2001066319 A | 3/2001 |
| JP | 4838229 B2 | 12/2011 |
| KR | 1020000064964 A | 11/2000 |

* cited by examiner

CROSS-BEAM AXIAL ACCELEROMETER

CROSS-REFERENCE TO RELATED APPLICATIONS

This application claims the benefit of Korean Patent Application No. 10-2021-0136658 filed on Oct. 14, 2021, in the Korean Intellectual Property Office, the entire disclosure of which is incorporated herein by reference for all purposes.

BACKGROUND

1. Field of the Invention

One or more example embodiments relate to an accelerometer.

2. Description of the Related Art

An accelerometer refers to a sensor that converts a sensed acceleration into an electrical signal and measures. In the accelerometer, a method of sensing an acceleration may be largely classified into a piezoresistive type, a piezoelectric type, a resonant type, an electrostatic capacity type, and the like.

Since the accelerometer usually requires ultra-small sizes in tens to hundreds of micrometers, a method of processing and manufacturing silicon wafers through micro-electromechanical systems (MEMS) is used.

When determining the performance of the accelerometer, the accelerometer that promptly senses only the acceleration in an effective axial direction may be regarded as a high-performance accelerometer. Here, the effective axial direction refers to an axial direction of the acceleration to be sensed, and while precisely measuring the acceleration in the effective axial direction, a sensing in a direction other than the axial direction to be measured, that is, in the cross-axis direction should be avoided.

Therefore, in sensing an acceleration, there is a need for an accelerometer that may lower the sensitivity in the cross-axis direction.

In addition, the accelerometer must be sufficiently able to withstand an external force applied to the sensor due to a sudden acceleration or impact. Therefore, a structure is needed to detect damages in the accelerometer so that it may react quickly to damages in the internal structure. In addition, an accelerometer is needed that may expand a linear range of sensing frequencies by the functioning of a stopper while protrusions or groove structures formed on a cover of the sensor attenuate an impact.

As an example of the related art, Japanese Patent Laid-Open Publication No. 4838229 (published on Mar. 12, 2009) describes an accelerometer.

The above description is information the inventor(s) acquired during the course of conceiving the present disclosure, or already possessed at the time, and is not necessarily art publicly known before the present application was filed.

SUMMARY

Example embodiments provide an accelerometer with high sensing precision by forming an elastic beam at an upper side and a lower side of a central body and lowering sensing sensitivity for an acceleration in a cross direction other than an acceleration axis direction to be sensed.

According to an aspect, there is provided an accelerometer that may quickly identify damages of the elastic beam and detect a malfunction of the sensor by further including diagnostic elements for detecting damages in the elastic beam.

According to another aspect, there is provided an accelerometer that may buffer, adjust, or block transmission of external physical impacts, heat, or electromagnetic waves by installing an additional functional layer.

According to an example embodiment, an accelerometer may include a frame portion with an opening formed inside, a central portion disposed in the opening, a connecting portion disposed on an upper surface and a lower surface of the central portion and connecting the frame portion and the central portion, and a sensing portion that converts a sensed acceleration into an electrical signal, and the accelerometer may sense an acceleration in a Z-axis direction penetrating an upper surface and a lower surface of the central portion, and reduce a sensing of an acceleration in an X-axis direction and a Y-axis direction crossing the Z-axis direction.

The connecting portion may include a first elastic beam extending from an upper surface of the central portion and connected to the frame portion, and a second elastic beam extending from a lower surface of the central portion and connected to the frame portion, and the first elastic beam and the second elastic beam may be disposed in a direction crossing each other.

The sensing portion may include a sensing element sensing an acceleration, an electrode transmitting an electrical signal of a sensed acceleration, and a wire electrically connecting the sensing element and the electrode, and the sensing element may be disposed on a surface or inside of the first elastic beam or the second elastic beam.

The sensing element may be configured to be a plurality of sensing elements and each of the sensing elements may be disposed on a same plane or on a different plane.

The first elastic beam or the second elastic beam may include at least one or more grooves formed on the first elastic beam or the second elastic beam.

Widths of the first elastic beam and the second elastic beam may be formed to be narrower than a width of one side of the central portion.

The electrode may be disposed on a surface or inside of the frame portion or the central portion, a lower surface of the frame portion may be attached to external equipment and fixed when the electrode is disposed in the frame portion, and a lower surface of the central portion may be attached to external equipment and fixed when the electrode is disposed in the central portion.

The sensing element may be formed of a piezoelectric material, a piezoresistive material, or a resonant structure.

The first elastic beam and the second elastic beam may further include a diagnostic element disposed on a surface of the first elastic beam or the second elastic beam to diagnose damages to each elastic beam.

The wire may include a trimming resistance disposed on a portion of the wire.

The sensing portion may include a first cover covering an upper side of the accelerometer, a second cover covering a lower side of the accelerometer, a first electrode installed on an upper surface of the central portion or the frame portion, a second electrode installed on a lower surface of the central portion or the frame portion, a third electrode facing the first electrode and disposed on one surface of the first cover, and a fourth electrode facing the second electrode and disposed on one surface of the second cover, and a method of measuring an acceleration of the sensing portion may be characterized in a method of measuring electrostatic capacity between a plurality of electrodes.

The accelerometer may include a cover portion disposed on an upper side or a lower side of the accelerometer, and one surface of the frame portion, one surface of the central portion, and one surface of the cover portion facing the frame portion and the central portion may be formed as a plane.

The accelerometer may further include a cover portion disposed on an upper side or a lower side of the accelerometer, and a bump or a hole may be formed on at least one surface of the frame portion, one surface of the central portion, or one surface of the cover portion facing the frame portion and the central portion.

The accelerometer may further include a cover portion disposed on an upper side or a lower side of the accelerometer, and at least one receiving element may be formed on one surface of the frame portion or one surface of the central portion, and a bonding agent or an electrode may be received inside the receiving element.

The cover portion may include a functional layer.

According to example embodiments, the accelerometer may increase sensing precision by forming an elastic beam at an upper side and a lower side of a central body and lowering sensing sensitivity for an acceleration in a cross direction other than an acceleration axis direction to be sensed.

According to example embodiments, the accelerometer may quickly identify damages of the elastic beam and detect a malfunction of the sensor by further including diagnostic elements for detecting damages in the elastic beam.

According to example embodiments, the accelerometer may buffer, adjust, or block transmission of external physical impacts, heat, or electromagnetic waves by installing an additional functional layer.

DETAILED DESCRIPTION

Hereinafter, examples will be described in detail with reference to the accompanying drawings. The following description is one of several aspects of example embodiments, and the following description forms part of a detailed description of the example embodiment.

However, in the description of example embodiments, detailed description of well-known related structures or functions will be omitted when it is deemed that such description will cause ambiguous interpretation of the present disclosure.

In addition, terms or words used in the present specification and claims should not be construed in general meanings or dictionary definitions, and based on a principle that the inventor may properly define the concept of terms in order to best describe their invention, the terms or words should be construed as meanings and concepts consistent with the technical idea of an accelerometer according to an example embodiment.

The example embodiments described herein and structures illustrated in the accompanying drawings relate to a most desirable example of an accelerometer, but not represent all technical features of the accelerometer. Thus, it is understood that various modifications and equivalents that replace the example embodiments and structures may also be available.

Figure 1A:
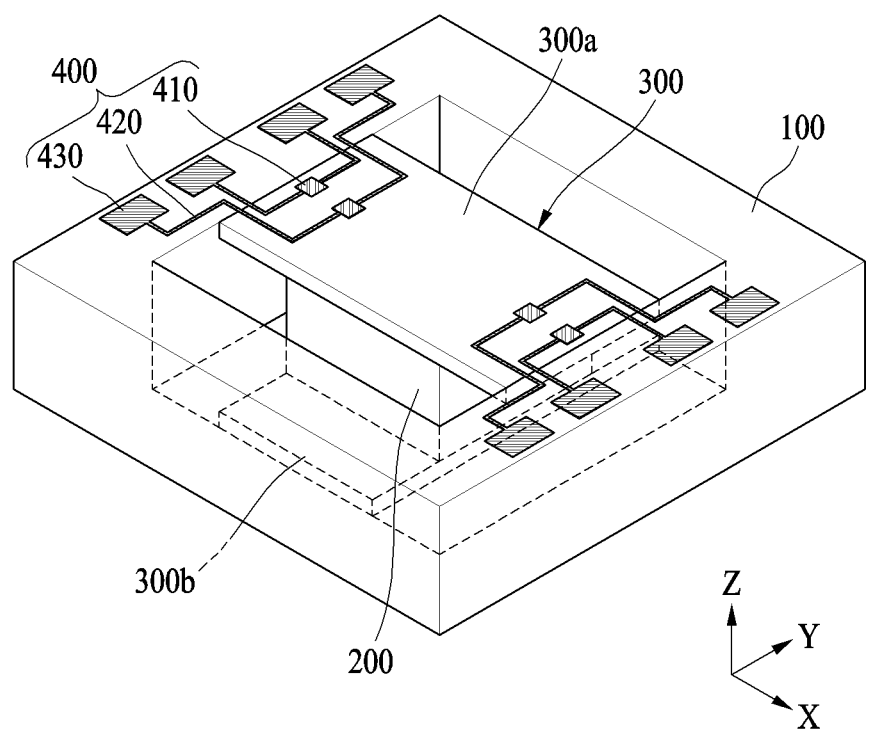
FIG. 1A is a perspective view illustrating an accelerometer according to an example embodiment.

FIG. 1A is a perspective view illustrating an accelerometer according to an example embodiment.

Referring to FIG. 1A, the accelerometer according to an example embodiment may include a frame portion 100 with an opening formed in a center, a central portion 200 disposed in an opening inside the frame portion, a connecting portion 300 connecting the central portion and the frame portion, and a sensing portion 400 sensing an acceleration and converting the sensed acceleration into an electrical signal.

The connecting portion 300 may include a first elastic beam 300a extending from an upper surface of the central portion 200 and connected to the frame portion 100, and a second elastic beam 300b extending from a lower surface of the central portion and connected to the frame portion.

The first elastic beam 300a and the second elastic beam 300b including the connecting portion 300 are elastic members formed in a shape of a beam, and a deformation such as extension and contraction may occur according to a relative movement of the central portion 200 and the frame portion 100.

The sensing portion 400 may be disposed on a portion of the frame portion 100, the central portion 200, or the connecting portion 300. The sensing portion 400 may include a sensing element 410 sensing an acceleration, an electrode 430 transmitting an electrical signal of the sensed acceleration, and a wire 420 electrically connecting the sensing element and the electrode.

In the accelerometer, according to an example embodiment, the central portion 200 may function as a mass. When the accelerometer moves with an acceleration, a deformation may occur in each elastic beam connected to the central body due to the inertia of the central body.

Accordingly, the sensing element 410 disposed on each elastic beam may sense a deformation, and the wire 420 connected to the sensing element and the electrode 430 connected to the wire may convert the sensed acceleration into an electrical signal.

Referring to FIG. 1A, the electrode 430 may be disposed on the frame portion. On the other hand, referring to FIG. 1B, a shape in which the electrode 430 of the accelerometer is disposed on an upper surface of the central portion 200 according to an example embodiment is illustrated.

As described above, the electrode 430 of the sensing portion may be disposed on an upper surface of the central portion 200 in addition to the frame portion 100. That is, since the sensing element 410 serves to detect a deformation of the elastic beam, the sensing element 410 should be positioned on the elastic beam, but the position of the electrode 430 that converts an acceleration sensed by the sensing element into an electrical signal may have no limitation.

The sensing element 410 may be a piezoresistive, a piezoelectric, or a resonant structure, and may sense an acceleration using a method of measuring electrostatic capacity as will be described later. In the case of the piezoresistive sensing element and the piezoelectric sensing element, the electrical characteristics of materials may be used for the accelerometer, and in the case of the resonant structure sensing element, a change in resonant frequencies of the resonant structure according to a change in an acceleration may be used for the accelerometer. However, the types of sensing elements are not necessarily limited thereto.

In addition, the accelerometer according to an example embodiment may have one surface attached to an object to sense an acceleration of a certain object. When a lower surface of the accelerometer is attached to the object, the accelerometer attached to the object also moves as the object moves, and thus the acceleration of the object may be measured.

However, since the accelerometer according to an example embodiment measures the acceleration through a relative movement of the central portion 200 and the frame portion 100 due to the inertia, so the acceleration may not be measured when both the central portion and the frame portion are firmly attached to the object.

That is, when both the central portion and the frame portion are attached to the object, the deformation may not occur in the first elastic beam 300a and the second elastic beam 300b including the connecting portion, and thus the sensing element may not sense the acceleration.

Accordingly, only one of the frame portion 100 and the central portion 200 may be attached to the object. For example, when a lower surface of the frame portion 100 is attached to and fixed to the object, the central portion 200 may be connected to the first elastic beam 300a and the second elastic beam 300b and be placed in a movable state.

In this case, the electrode 430 among components including the sensing portion as illustrated in FIG. 1A may be disposed on the frame portion 100 and fixed to the object with the frame portion. That is, unlike the sensing element 410 that needs to detect the deformation due to the movement of the elastic beam, the electrode doesn't need to move, so it may be fixed with the frame portion.

Figure 1B:
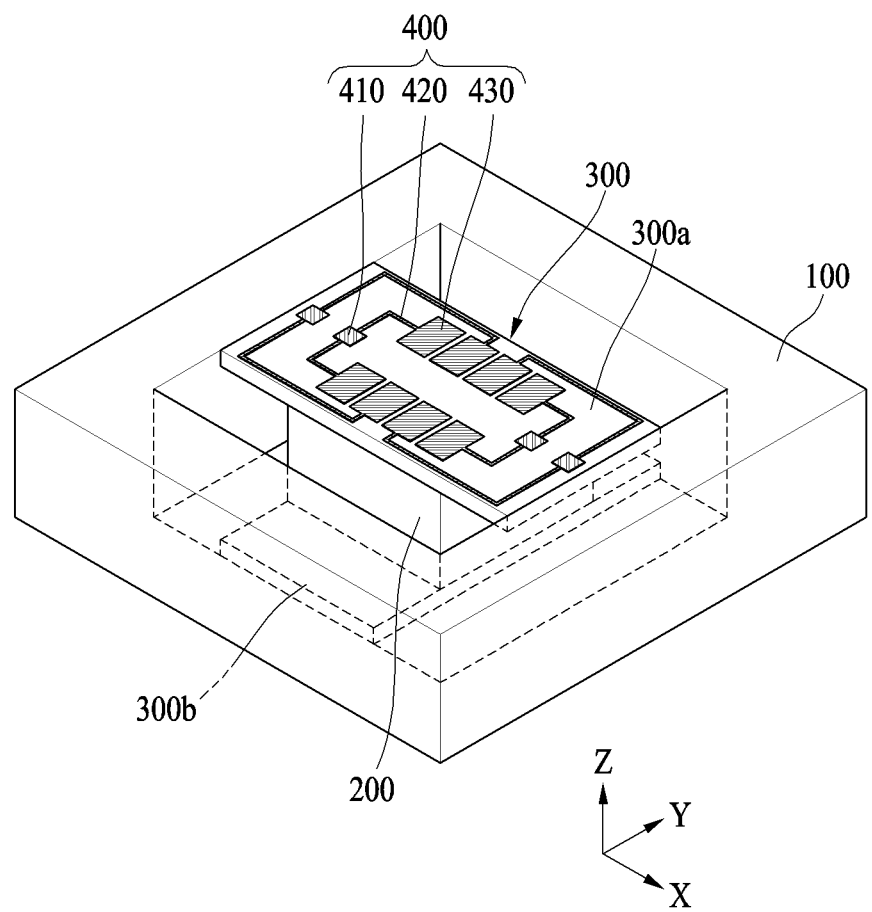
FIG. 1B is a diagram illustrating a shape in which an electrode of an accelerometer is disposed on an upper surface of a central portion according to an example embodiment.

In contrast, when a lower surface of the central portion 200 is attached to and fixed to the object, the frame portion 100 may be placed in a relatively movable state with respect to the central portion as illustrated in FIG. 1B. In this case, the electrode may be disposed at the central portion.

Hereinafter, the mechanism of the accelerometer will be described in detail.

First, a direction of the acceleration to be sensed by the accelerometer according to an example embodiment is a Z-axis direction, and the Z-axis direction may refer to an axial direction penetrating an upper surface and a lower surface of the central portion 200 vertically. The axial direction other than this may be defined as a cross-axis direction (e.g., an X-axis direction and a Y-axis direction crossing vertically to the Z-axis direction).

Figure 2:
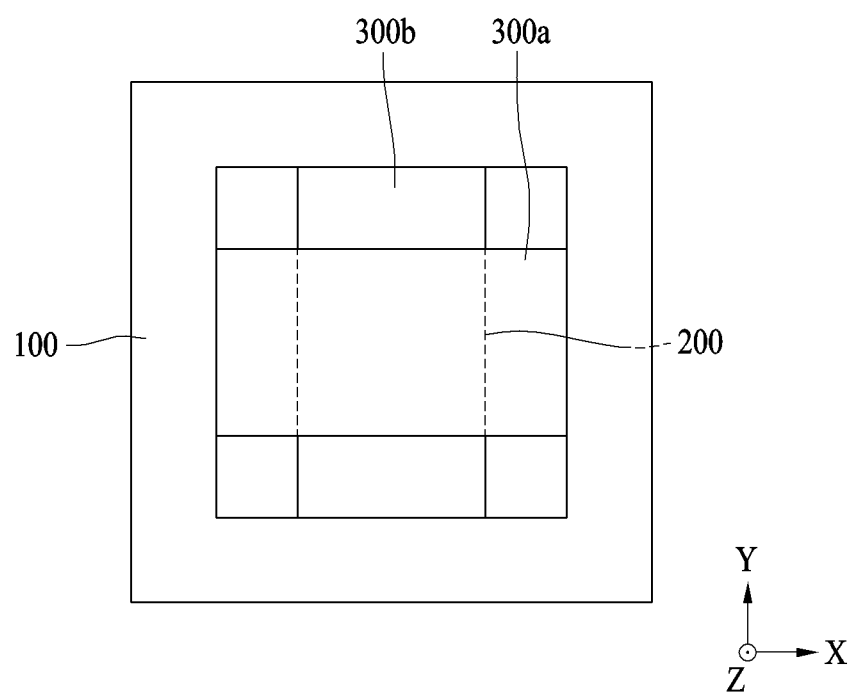
FIG. 2 is a diagram illustrating a shape of an accelerometer viewed from an upper side according to an example embodiment.

FIG. 2 is a diagram illustrating a shape of an accelerometer viewed from an upper side according to an example embodiment.

The first elastic beam 300a and the second elastic beam 300b may be disposed in a direction crossing each other when viewed from an upper side of the accelerometer. Referring to FIG. 2, the first elastic beam 300a and the second elastic beam 300b touching an upper surface and a lower surface of the central portion 200, respectively, may be formed to cross each other vertically.

Figure 3A:
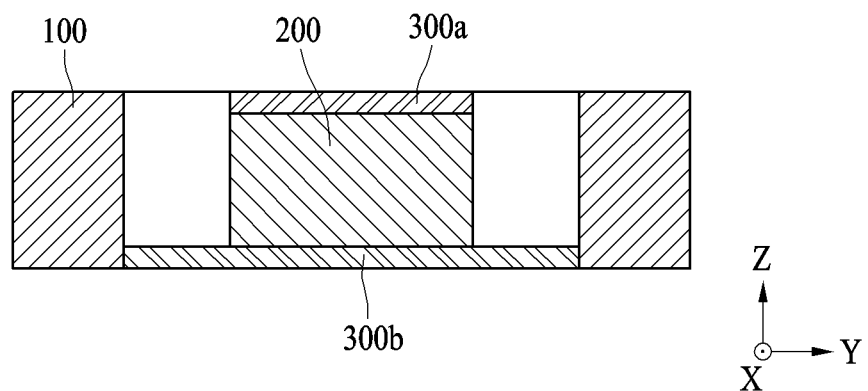
FIGS. 3A and 3B are cross-sectional side views illustrating an accelerometer according to an example embodiment.
Figure 3B:
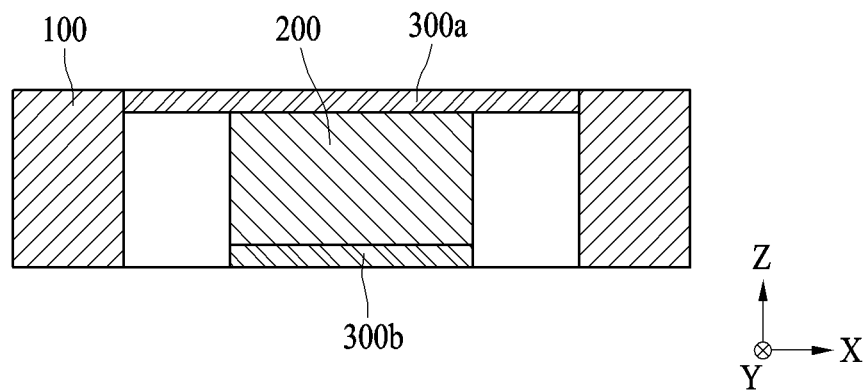

FIGS. 3A and 3B are cross-sectional side views illustrating an accelerometer according to an example embodiment.

Referring to FIGS. 3A and 3B, when viewed from the X-axis or the Y-axis direction, respectively, the first elastic beam 300a may extend from an upper surface of the central portion 200 and be connected to the frame portion 100, and the second elastic beam 300b may extend from a lower surface of the central portion 200 and be connected to the frame portion 100.

Due to the restoring force of each elastic beam disposed crossing each other as described above, it is possible to reduce the behavior of the central body in the direction of the cross-axis. Therefore, only the direction of the Z-axis acceleration to be measured may be effectively sensed.

Figure 4A:
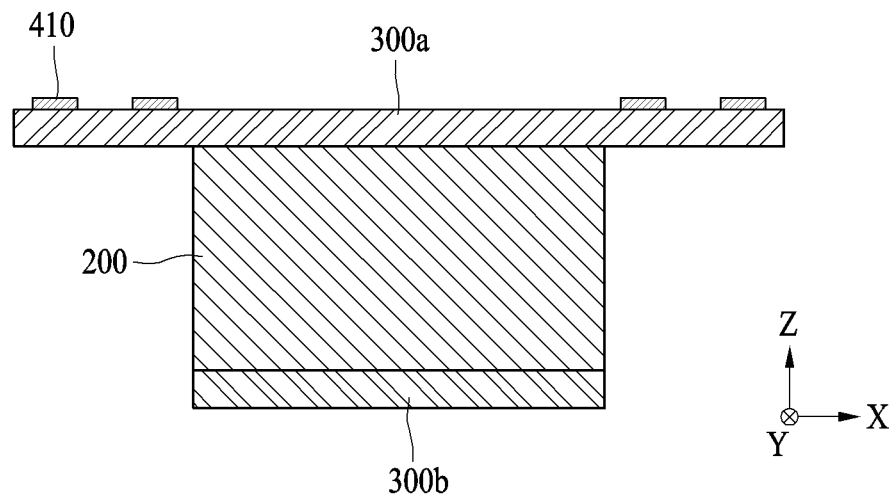
FIGS. 4A to 4C are diagrams illustrating a position of a sensing element 410 that may be disposed on an elastic beam in an accelerometer according to an example embodiment.
Figure 4B:
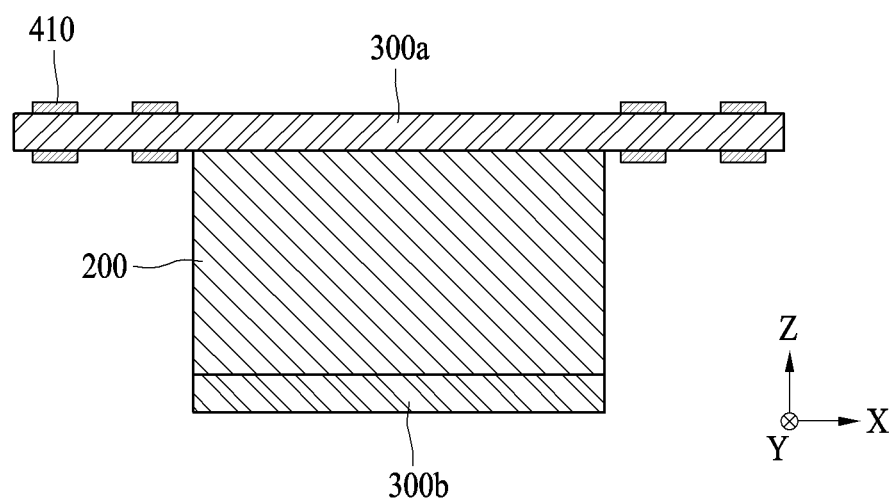
Figure 4C:
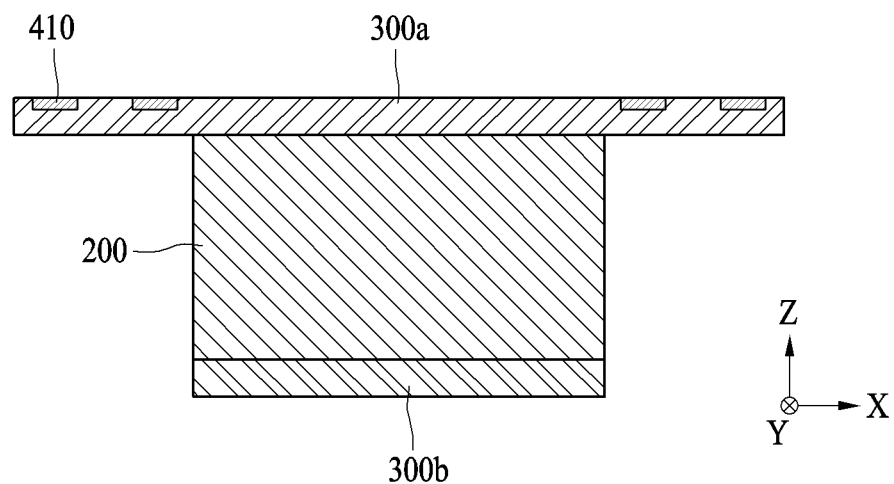

FIGS. 4A to 4C are diagrams illustrating a position of a sensing element 410 that may be disposed on an elastic beam in an accelerometer according to an example embodiment.

A plurality of sensing elements may be formed, and the plurality of sensing elements may be respectively disposed on a same plane or a different plane.

Referring to FIG. 4A, a shape in which a plurality of sensing elements 410 is disposed on an upper surface of the first elastic beam 300a is illustrated. Referring to FIG. 4B, the sensing element is not necessarily disposed on an upper surface of the elastic beam and may be disposed simultaneously on a lower surface and an upper surface of the elastic beam. Also, referring to FIG. 4C, the sensing element may be formed on a surface of the elastic beam and inside the elastic beam.

The sensing element formed in plurality may be disposed on a same plane or a different plane on the elastic beam as described above, but an arrangement structure of the sensing element is not limited to the form illustrated in FIGS. 4A to 4C, and the sensing element may be disposed on a surface or inside the second elastic beam in addition to the first elastic beam.

Figure 5A:
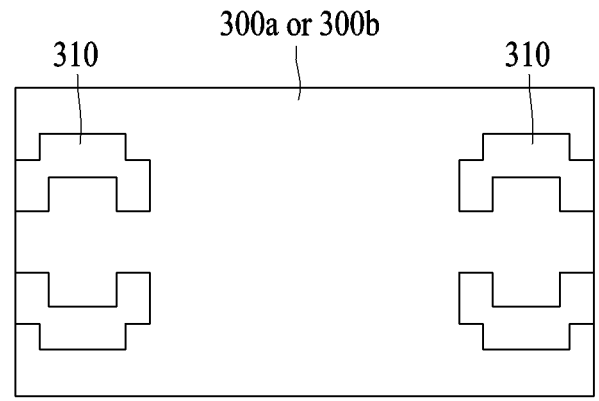
FIG. 5A is a diagram illustrating a shape of an elastic beam having a groove formed in a portion in an accelerometer according to an example embodiment.

FIG. 5A is a diagram illustrating a shape of an elastic beam having a groove formed in a portion in an accelerometer according to an example embodiment.

Referring to FIG. 5A, the first elastic beam 300a and the second elastic beam 300b may include a groove 310 formed at a portion of both ends thereof. The elastic beam having a groove decreases elastic modulus. Therefore, the elastic beam may react promptly to a smaller acceleration, and accordingly, the sensitivity of accelerometer may be increased.

Figure 5B:
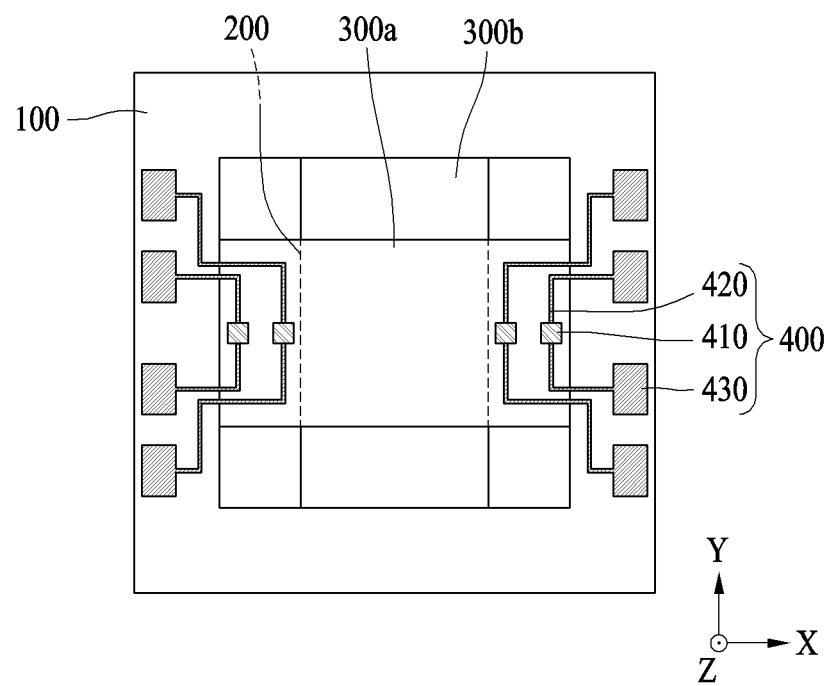
FIG. 5B is a diagram illustrating an accelerometer including an elastic beam having no grooves according to an example embodiment.

FIG. 5B is a diagram illustrating an accelerometer including an elastic beam having no grooves according to an example embodiment. On the other hand, FIG. 5C is a diagram illustrating an accelerometer including an elastic beam having a groove according to an example embodiment.

Figure 5C:
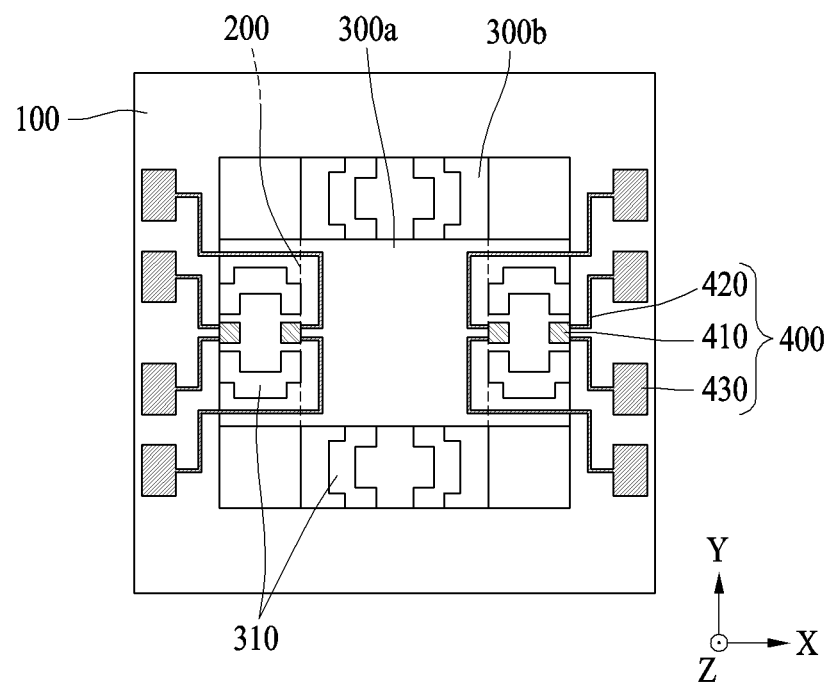
FIG. 5C is a diagram illustrating an accelerometer including an elastic beam having a groove according to an example embodiment.

Referring to FIG. 5C, in the case of the accelerometer having an elastic beam including grooves 310 formed at both ends, the sensing element 410 may be disposed in the remaining area between the grooves.

In this case, even when the same acceleration is applied to the accelerometer, the deformation width of the elastic beam of the sensor attachment portion may become larger than that of the accelerometer (see FIG. 5B) having a general elastic beam. That is, even when the same sensor is used, the effect of amplifying an output value may be obtained.

Figure 5D:
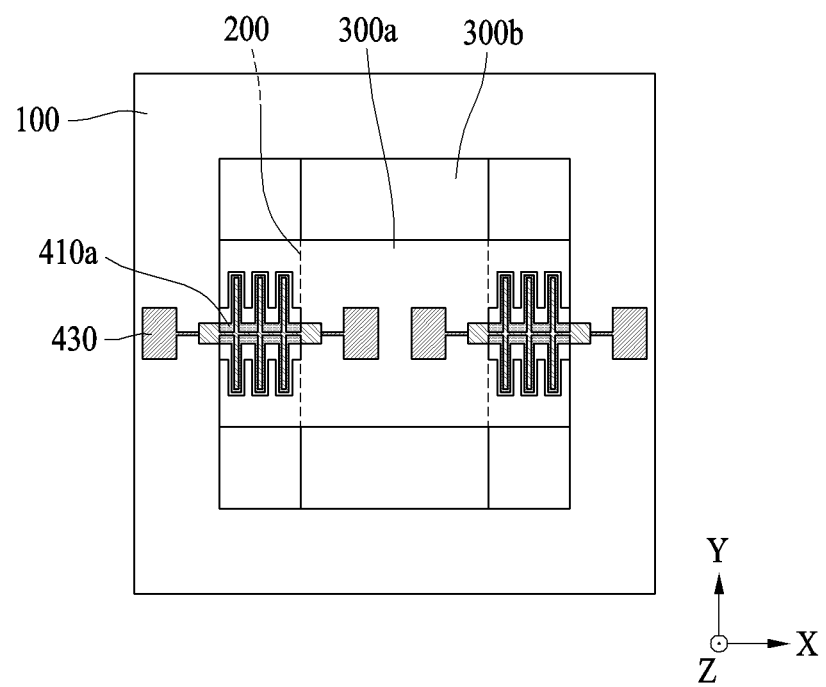
FIGS. 5D and 5E are diagrams illustrating a shape in which a sensing element is a resonant structure in an accelerometer according to an example embodiment.
Figure 5E:
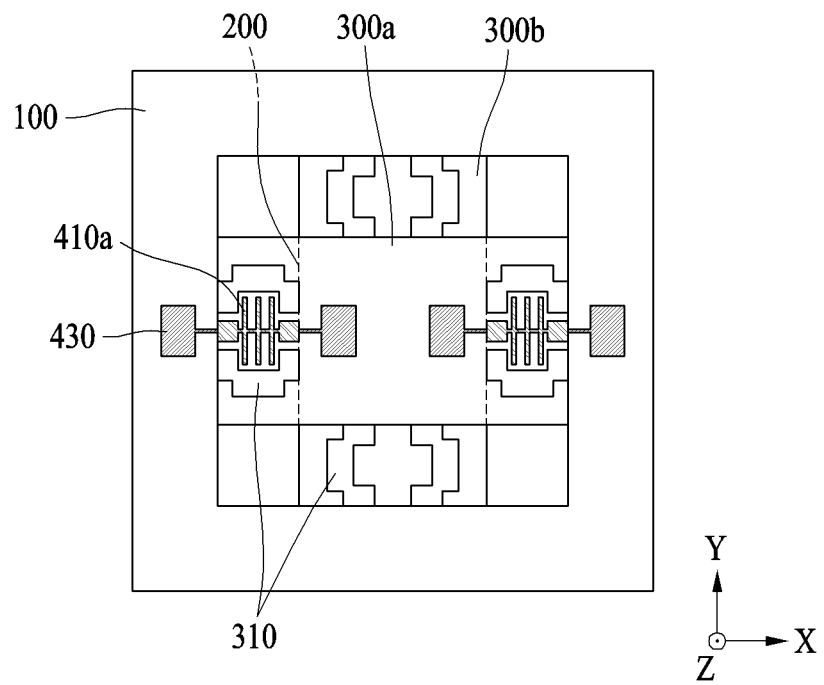

FIGS. 5D and 5E are diagrams illustrating a shape in which a sensing element 410 is a resonant structure in an accelerometer according to an example embodiment. When the groove 310 is formed on the elastic beam as illustrated in FIG. 5E, higher sensing sensitivity may be obtained compared to a case in which the opening is not formed (see FIG. 5D).

Figure 6:
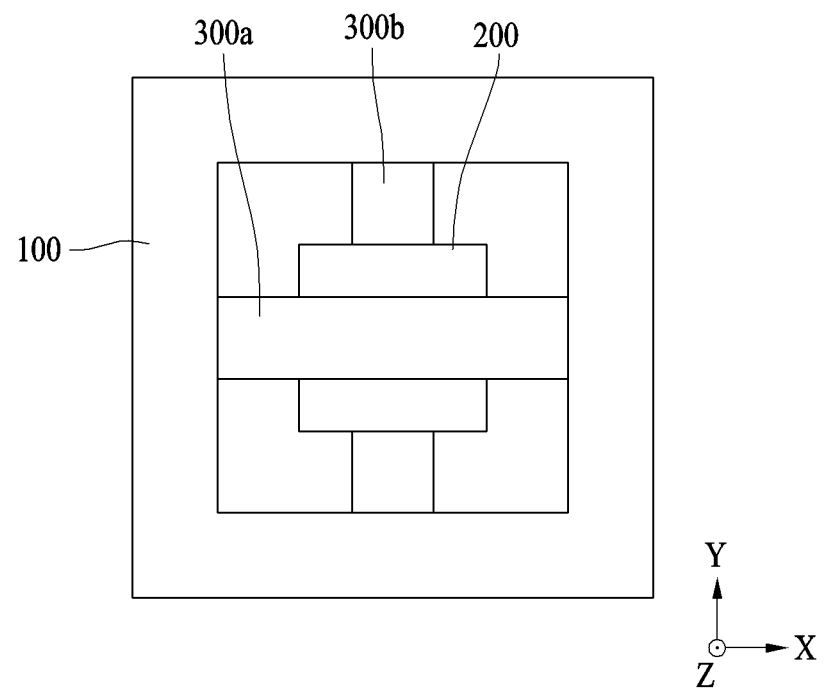
FIG. 6 is a diagram illustrating a shape in which widths of a first elastic beam and a second elastic beam are formed to be narrower than a width of one side of a central portion in an accelerometer according to an example embodiment.

FIG. 6 is a diagram illustrating a shape in which widths of the first elastic beam and the second elastic beam are formed to be narrower than a width of one side of the central portion in an accelerometer according to an example embodiment.

Referring to FIG. 6, widths of the first elastic beam 300a and the second elastic beam 300b disposed on an upper surface and a lower surface of the central portion 200 may be formed to be narrower than a width of one side of the central portion.

In this case, the elastic modulus of each elastic beam may become smaller than when the width of each elastic beam is formed to be the same as the width of one side of the central portion. Accordingly, even when the same acceleration is applied, the width of the movement of the center portion becomes larger, and thus, the effect of increasing the sensing sensitivity may be obtained.

Figure 7A:
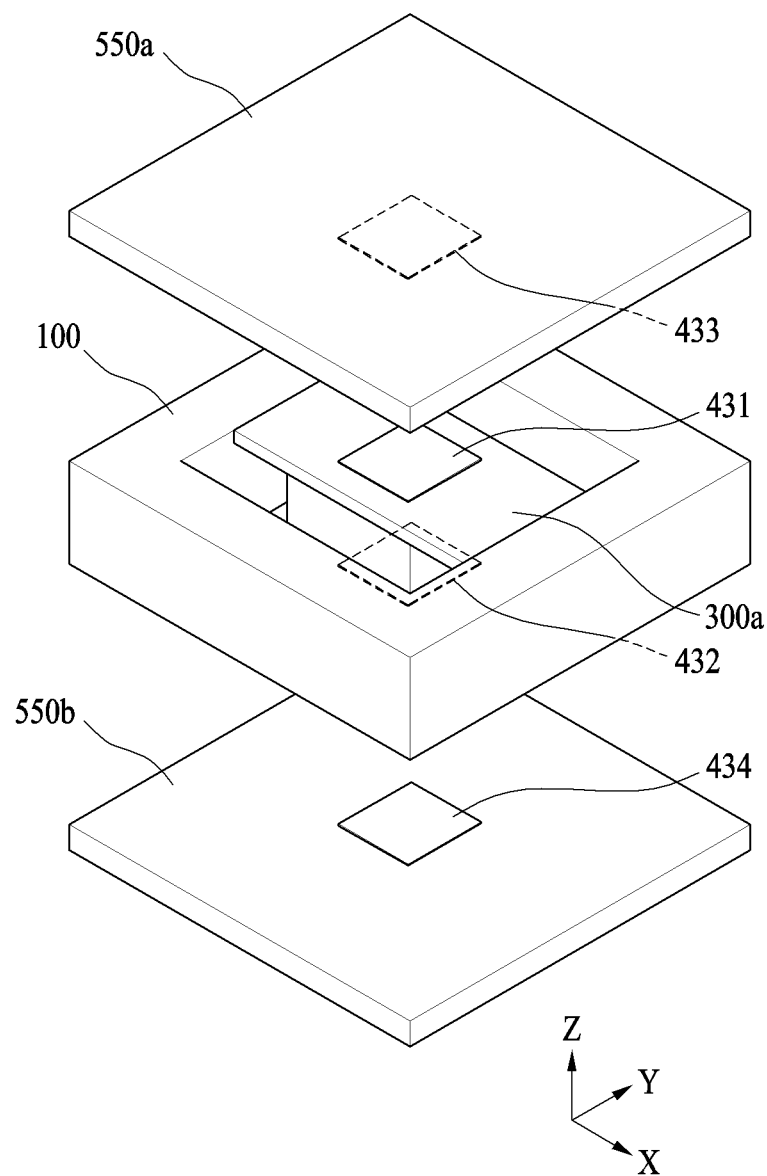
FIGS. 7A and 7B are diagrams illustrating an accelerometer that senses an acceleration using a method of measuring electrostatic capacity according to an example embodiment.
Figure 7B:
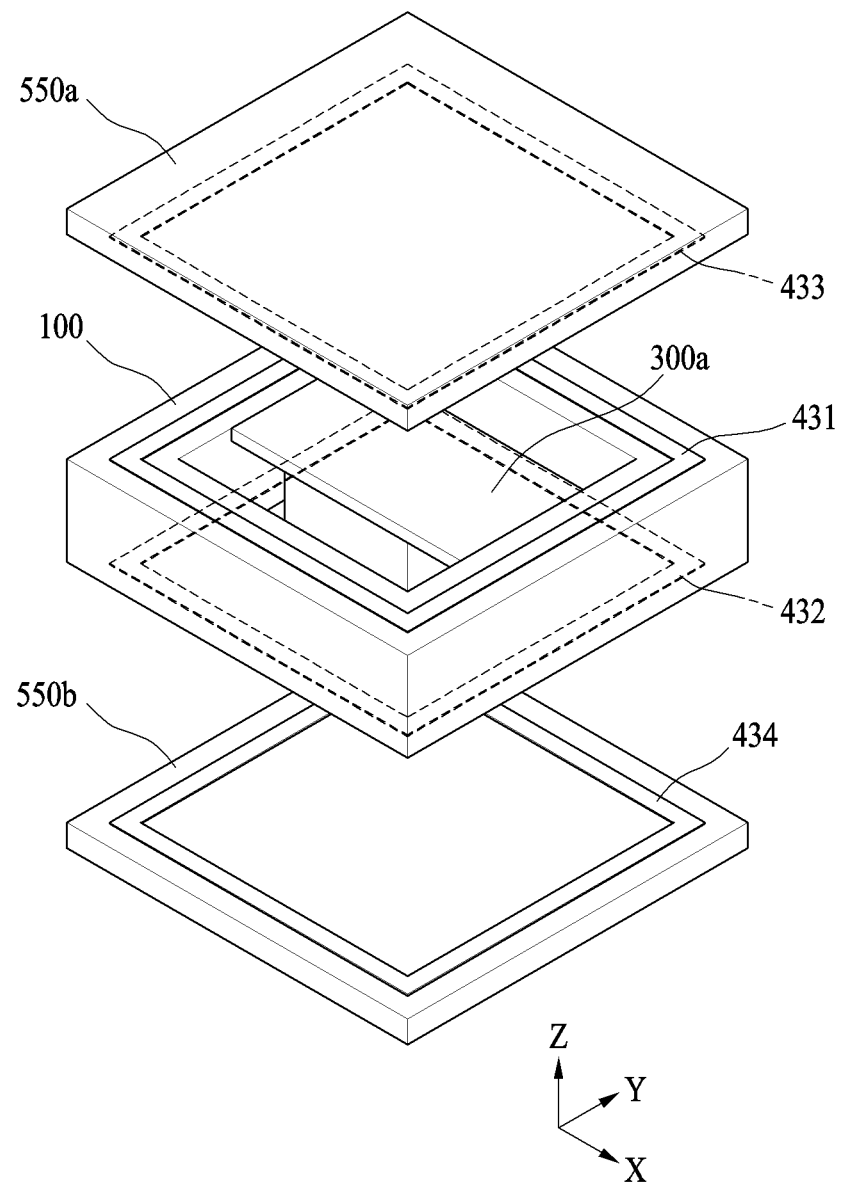

FIGS. 7A and 7B are diagrams illustrating an accelerometer that senses an acceleration using a method of measuring electrostatic capacity according to an example embodiment.

Specifically, FIG. 7A may represent a shape such that a first electrode 431 and a second electrode 432 are installed on an upper surface and a lower surface of the central portion, respectively, and a third electrode 433 corresponding to the first electrode and a fourth electrode 433 corresponding to the second electrode are installed on a first cover 550a and a second cover 550b, respectively. FIG. 7B may represent a shape such that the first electrode 431 and the second electrode 432 are installed in the frame portion, and the third electrode 433 corresponding to the first electrode and the fourth electrode 434 corresponding to the second electrode are installed in the first cover 550a and the second cover 550b, respectively.

Referring to FIGS. 7A and 7B, the accelerometer according to an example embodiment may further include the first cover 550a that covers an upper surface of the frame portion 100, the central portion 200, and the connecting portion 300, and the second cover 550b that covers a lower surface thereof.

Since the first cover 550a and the second cover 550b are used as an attaching portion of an electrode, it is possible to provide an accelerometer that measures electrostatic capacity.

That is, the accelerometer using a method of measuring electrostatic capacity may sense an acceleration by configuring a capacitor using the first electrode 431 and the second electrode 432 installed on one surface of the central portion or the frame portion, and corresponding to thereof, the third electrode 433 and the fourth electrode 434, which face the first electrode and the second electrode and are disposed on one surface of the first cover 550a and the second cover 550b, respectively.

When an acceleration is applied to the accelerometer, a movement may occur in the third electrode 433 facing the first electrode 431 as the central portion 200 and the frame portion 100 relatively move. Accordingly, a distance between the electrodes may be changed, and as the distance between the electrodes is changed, the electrostatic capacity of the capacitor may increase or decrease. The increase/decrease in the electrostatic capacity may also occur between the second electrode 432 and the fourth electrode 434. In this way, the acceleration may be sensed using a method of measuring the increase/decrease of the electrostatic capacity.

Figure 8:
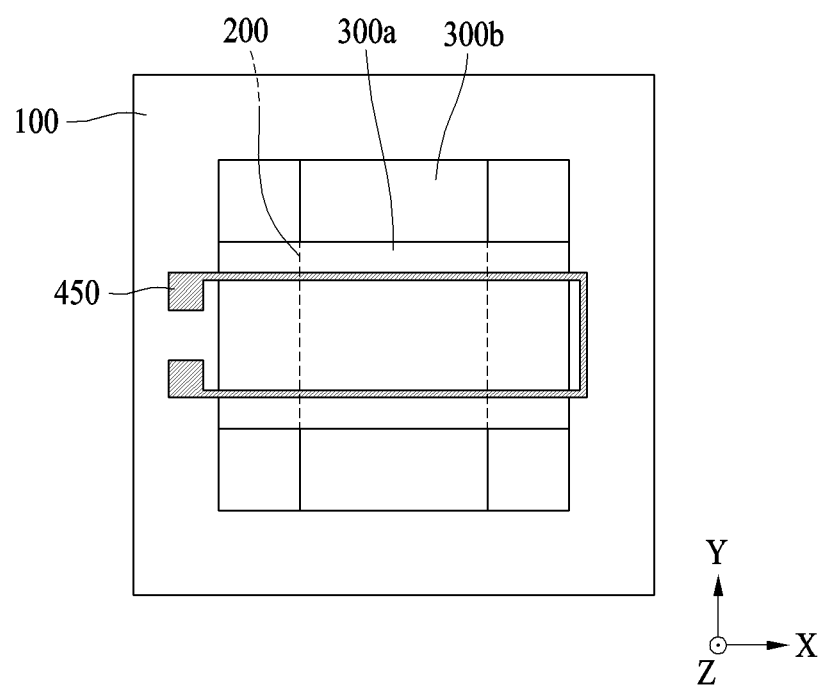
FIG. 8 is a diagram illustrating a shape in which a diagnostic element is disposed on a surface of a first elastic beam in an accelerometer according to an example embodiment.

FIG. 8 is a diagram illustrating a shape in which a diagnostic element 450 is disposed on a surface of a first elastic beam 300a in an accelerometer according to an example embodiment.

In the accelerometer according to an example embodiment, each elastic beam may correspond to a key component that is deformed in response to an acceleration. When the elastic beam is broken or damaged, an error may occur in sensing the acceleration or the precision may be greatly reduced. Therefore, it is possible to identify and react to the damages of the elastic beam early through the diagnostic element 450.

Referring to FIG. 8, the diagnostic element 450 formed to diagnose damages may be disposed on a surface of the first elastic beam 300a, but an arrangement of the diagnostic element is not necessarily limited to on the first elastic beam and may also be disposed on the second elastic beam 300b.

Figure 9:
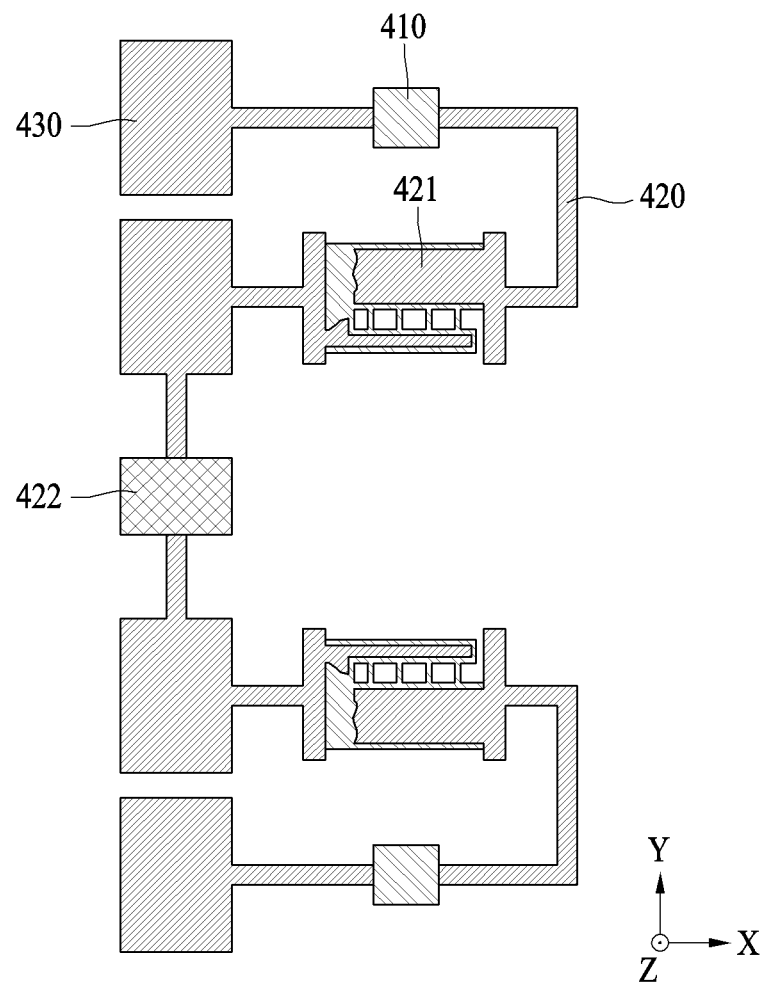
FIG. 9 is a diagram illustrating a shape in which a trimming resistance is included in a wire in an accelerometer according to an example embodiment.

FIG. 9 is a diagram illustrating a shape in which a trimming resistance 421 is included in a wire 420 in an accelerometer according to an example embodiment. Through the trimming resistance 421 on the wire and a correcting circuit 422 for correcting an output value of electrodes, the sensing sensitivity may be controlled according to a situation by changing the size of the overall resistance as needed.

Figure 10:
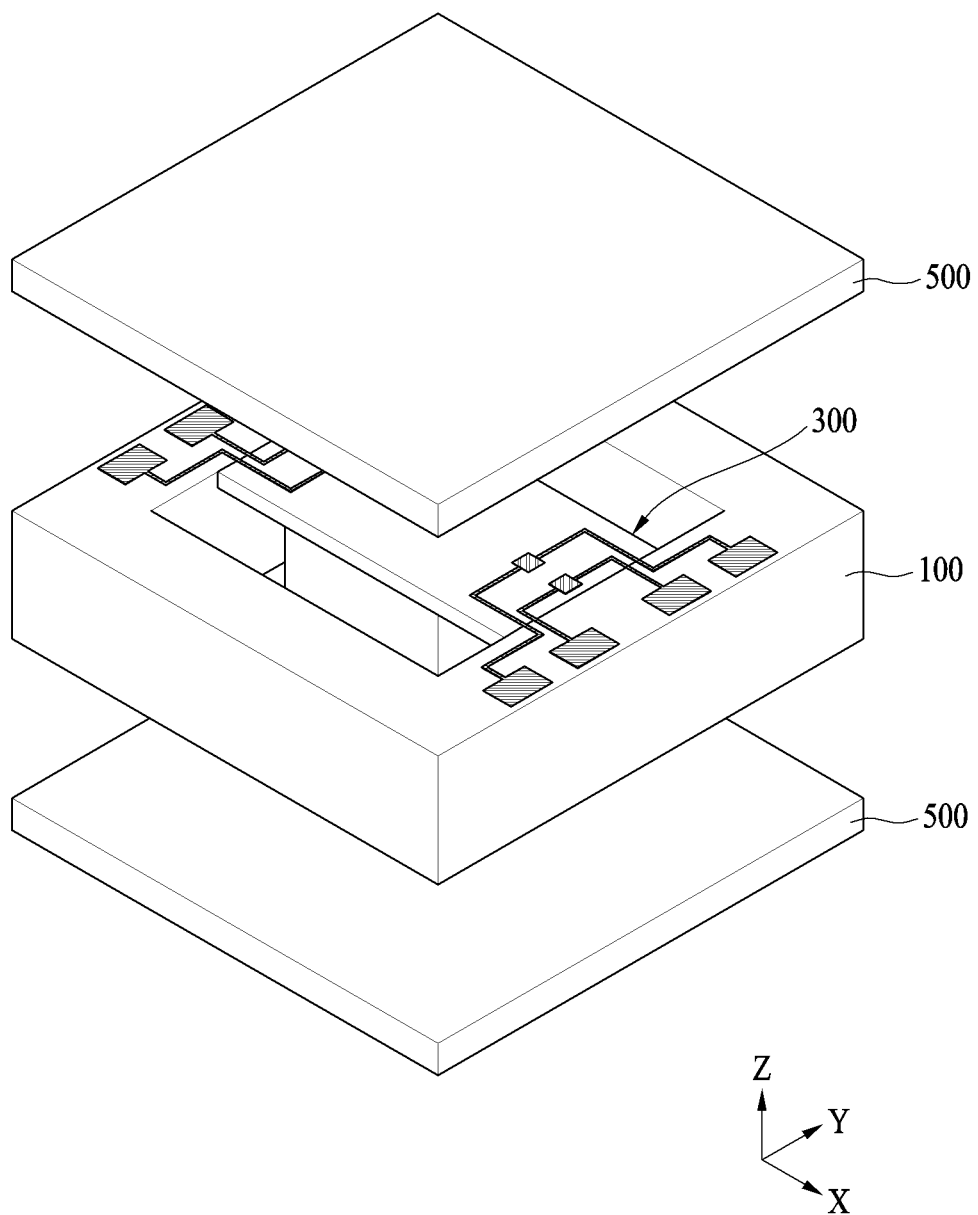
FIG. 10 is a diagram illustrating an accelerometer in which a cover portion is formed according to an example embodiment.

FIG. 10 is a diagram illustrating an accelerometer in which a cover portion 500 is formed according to an example embodiment.

The accelerometer according to an example embodiment may be formed to further include the cover portion 500, and the cover portion 500 may protect the accelerometer from external foreign materials and impacts and be utilized as an attachment site for an electrode and a bonding agent.

Referring to FIG. 10, the cover portion 500 may cover both an upper surface and a lower surface of the accelerometer. However, the present disclosure is not necessarily limited thereto, and the cover portion may cover only one surface (e.g., an upper surface) of the accelerometer. In addition, one surface of the cover portion may be formed in a plane as illustrated in FIG. 10, but is not necessarily limited to a plane and may be in a state in which a bump or a hole is formed.

Figure 11A:
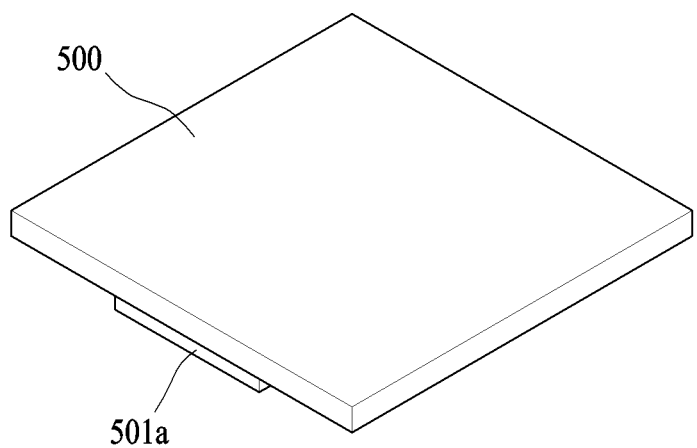
FIGS. 11A, 11B, and 11C are diagrams illustrating a shape of a cover portion formed in a form in which one surface is not a plane.
Figure 11C:
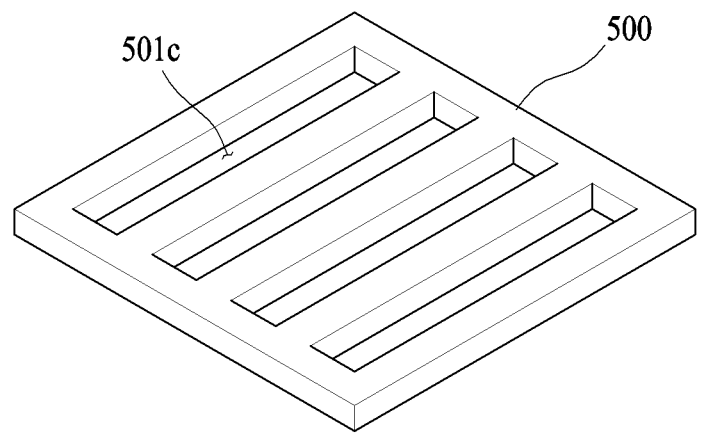
Figure 11B:
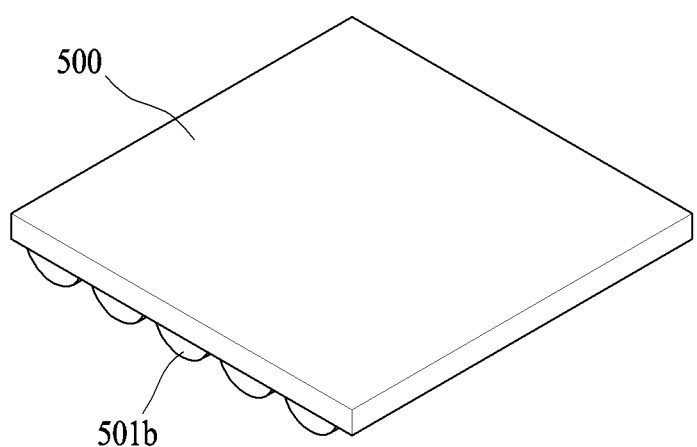

FIGS. 11A, 11B, and 11C are diagrams illustrating a shape of a cover portion 500 formed in a form in which one surface is not a plane.

First, a bump may be formed on one surface of the cover portion 500. Referring to FIG. 11A, the bump may be a step 501a. Alternatively, referring to FIG. 11B, the bump may be at least one or more protrusions 501b. Referring to FIG. 11C, at least one or more holes 501c may already be formed in the cover portion 500.

However, the bump or the hole may not necessarily be formed only on the cover portion 500, and may be formed on one surface of the frame portion or the central portion corresponding to the cover portion.

Figure 12A:
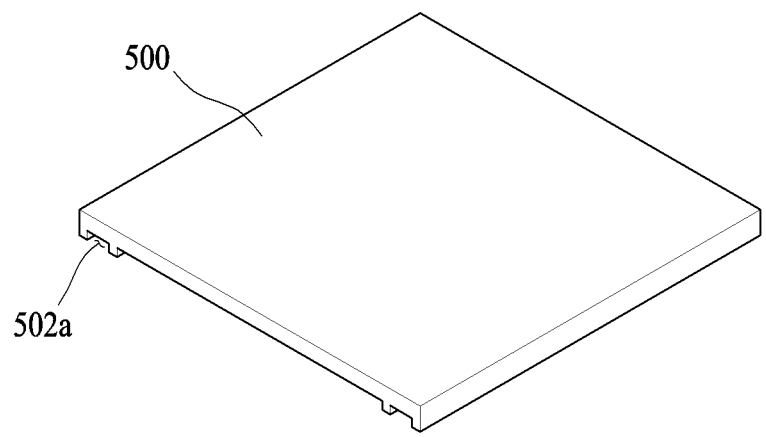
FIGS. 12A and 12B are diagrams illustrating a shape of a cover portion having a receiving element formed on one surface in an accelerometer according to an example embodiment.
Figure 12B:
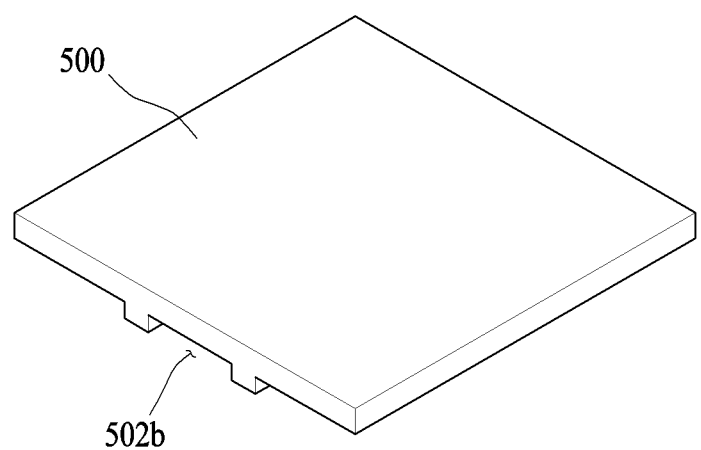

FIGS. 12A and 12B are diagrams illustrating a shape of a cover portion having receiving elements 502a and 502b formed on one surface in an accelerometer according to an example embodiment.

An electrode of the sensing portion may be disposed on the receiving element or a bonding agent for attaching the cover portion may be filled inside the receiving element. However, the receiving element may be formed on the cover portion 500 as in FIGS. 12A and 12B, and may also be formed on one surface of the frame portion or the central portion touching the cover portion. FIGS. 12A and 12B only illustrates the cover portion 500 as an example of a configuration in which a receiving element is formed.

Referring to FIG. 12A, the receiving element 502a may be formed at both ends of the cover portion. Referring to FIG. 12B, the receiving element 502b may be formed in the central portion of the cover portion.

Figure 13:
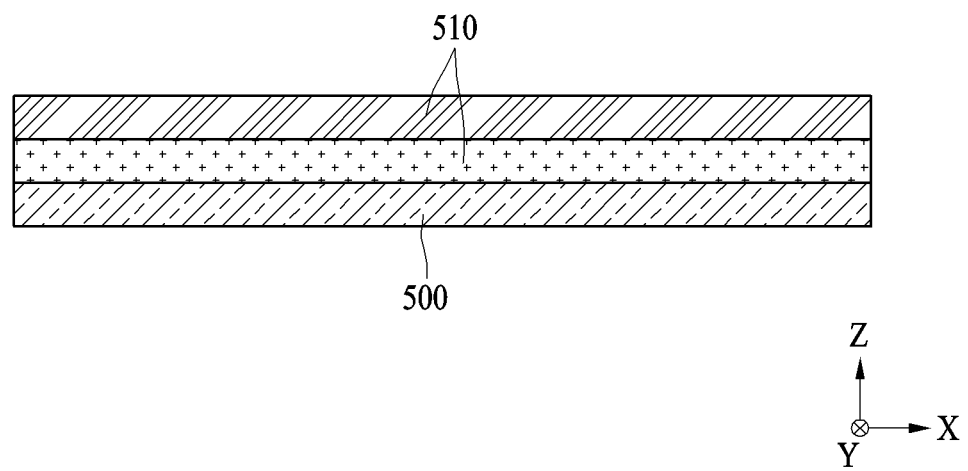
FIG. 13 is a diagram illustrating a shape in which a functional layer is further included in a cover portion in an accelerometer according to an example embodiment.

FIG. 13 is a diagram illustrating a shape in which a functional layer 510 is further included in a cover portion 500 in an accelerometer according to an example embodiment.

The functional layer 510 may be formed to buffer, adjust, or block transmission of external physical impacts, heat, or electromagnetic waves, and may be additionally disposed on the cover portion 500.

The example embodiments disclosed in the present specification and the drawings are intended merely to present specific examples in order to promote understanding of the present disclosure, but are not intended to limit the scope of the present disclosure. It will be apparent to those skilled in the art that various modifications based on the technical spirit of the present disclosure, as well as the disclosed example embodiments, can be made. Therefore, the scope of the disclosure is defined not by the detailed description, but by the claims and their equivalents, and all variations within the scope of the claims and their equivalents are to be construed as being included in the disclosure.

What is claimed is:

1. An accelerometer comprising:
a frame portion defining an aperture; and
a central portion suspended in the aperture; wherein the central portion is suspended by:
a connecting portion disposed on an upper surface and a lower surface of the central portion and connecting the frame portion and the central portion, wherein the connecting portion consists of:
a single first elastic beam extending only in an X-axis direction from the upper surface of the central portion and connected to the frame portion at first and second edges; and
a single second elastic beam extending only in a Y-axis direction from the lower surface of the central portion and connected to the frame portion at third and fourth edges;
wherein the first elastic beam and the second elastic beam have mutually transverse orientations, such that the single first elastic beam and the single second elastic beam overlap only at the central portion; and
a sensing portion that converts a sensed acceleration into an electrical signal,
wherein the accelerometer is configured to sense an acceleration in a Z-axis direction penetrating the upper surface and the lower surface of the central portion and to reduce a sensing of an acceleration in the X-axis direction and the Y-axis direction crossing the Z-axis direction,
wherein the first elastic beam has a same width as a width of the central portion in the Y-axis direction, and
wherein the second elastic beam has a same width as a width of the central portion in the X-axis direction.

2. The accelerometer of claim 1, wherein the sensing portion comprises:
a sensing element sensing an acceleration;
an electrode transmitting an electrical signal of the sensed acceleration; and
a wire electrically connecting the sensing element and the electrode,
wherein the sensing element is disposed on a surface or inside of the first elastic beam or the second elastic beam.

3. The accelerometer of claim 2, wherein the sensing element is configured to be a plurality of sensing elements and each of the sensing elements is disposed on a same plane or on a different plane.

4. The accelerometer of claim 3, wherein the first elastic beam or the second elastic beam comprise at least one or more grooves formed on the first elastic beam or the second elastic beam.

5. The accelerometer of claim 3, wherein widths of the first elastic beam and the second elastic beam are formed to be narrower than a width of one side of the central portion.

6. The accelerometer of claim 4, wherein
the electrode is disposed on a surface or inside of the frame portion, and
wherein, when the electrode is disposed on the surface of the frame portion, a lower surface of the frame portion is attached to external equipment and fixed,
wherein, when the electrode is disposed inside of the frame portion, a lower surface of the central portion is attached to external equipment and fixed.

7. The accelerometer of claim 6, wherein the sensing element is formed of a piezoelectric material, a piezoresistive material, or a resonant structure.

8. The accelerometer of claim 7, further comprising a diagnostic element disposed on a surface of the first elastic beam or the second elastic beam to diagnose damages to each elastic beam.

9. The accelerometer of claim 8, wherein the wire comprises a trimming resistance disposed on a portion of the wire.

10. The accelerometer of claim 1, wherein the sensing portion comprises:
a first cover covering an upper side of the accelerometer;
a second cover covering a lower side of the accelerometer;
a first electrode installed on the upper surface of the central portion or the frame portion;
a second electrode installed on the lower surface of the central portion or the frame portion;
a third electrode facing the first electrode and disposed on one surface of the first cover; and
a fourth electrode facing the second electrode and disposed on one surface of the second cover;
wherein a method of measuring an acceleration of the sensing portion is characterized in a method of measuring electrostatic capacity between a plurality of electrodes.

11. The accelerometer of claim 1, wherein the accelerometer further comprises:
a cover portion disposed an upper side or a lower side of the accelerometer,
wherein one surface of the frame portion, one surface of the central portion, and one surface of the cover portion facing the frame portion and the central portion are formed as a plane.

12. The accelerometer of claim 1, wherein the accelerometer further comprises:
a cover portion disposed on an upper side or a lower side of the accelerometer, and
wherein at least one bump or hole is formed on at least one surface among one surface of the frame portion, one surface of the central portion, or one surface of the cover portion facing the frame portion and the central.

13. The accelerometer of claim 1, wherein the accelerometer further comprises:
a cover portion disposed on an upper side or a lower side of the accelerometer, and
wherein at least one receiving element is formed on one surface of the frame portion or one surface of the central portion, and a bonding agent or an electrode is received inside of the receiving element.

14. The accelerometer of claim 11, wherein the cover portion comprises a functional layer.

15. The accelerometer of claim 4, wherein the electrode is disposed on a surface or inside of the central portion, and
wherein the lower surface of the central portion is attached to external equipment and fixed.

16. An accelerometer comprising:
a frame portion having a hole extending through the frame portion; and
a central portion suspended in the hole;
wherein the central portion is suspended entirely by a connecting portion consisting of:
a single first elastic beam, wherein a midpoint of the first elastic beam is coupled to an upper surface of the central portion and lateral edges of the first elastic beam are coupled to the frame portion; and
a single second elastic beam, wherein a midpoint of the second elastic beam is coupled to a lower surface of the central portion and lateral edges of the second elastic beam are coupled to the frame portion;
wherein the first elastic beam has a transverse orientation with respect to the second elastic beam; and
a sensing portion configured to convert a sensed displacement of the central portion into an electrical signal;
wherein the accelerometer is configured to sense an acceleration with respect to a Z-axis penetrating the upper surface and the lower surface of the central portion and configured to suppress sensing of an acceleration with respect to an X-axis and a Y-axis crossing the Z-axis,
wherein the first elastic beam has a same thickness as a thickness of the central portion in a Y-axis direction, and
wherein the second elastic beam has a same thickness as a thickness of the central portion in an X-axis direction.

17. The accelerometer of claim 5, wherein
the electrode is disposed on a surface or inside of the frame portion, and
wherein, when the electrode is disposed on the surface of the frame portion, a lower surface of the frame portion is attached to external equipment and fixed,
wherein, when the electrode is disposed inside of the frame portion, a lower surface of the central portion is attached to external equipment and fixed.

18. The accelerometer of claim 1, wherein respective end portions of the first and second elastic beams each include a plurality of grooves extending from the frame portion toward the central portion; and
wherein a respective groove-free central expanse of each beam is disposed between the end portions.

19. The accelerometer of claim 18, wherein the sensing portion is disposed between two grooves of the plurality of grooves.

* * * * *